3,256,280
CATALYTIC PROCESS FOR PRODUCTION OF TRIPIPERIDEINE BASES
John Anthony Corran, Widnes, England, assignor to Imperial Chemical Industries Limited, London, England, a corporation of Great Britain
No Drawing. Filed June 19, 1963, Ser. No. 288,900
Claims priority, application Great Britain, June 22, 1962, 24,085/62
7 Claims. (Cl. 260—248)

This invention relates to a catalytic process for the manufacture of organic bases, and more particularly for the manufacture of organic bases from tetrahydrofurfuryl alcohol and ammonia.

It is known that tetrahydrofurfuryl alcohol and ammonia can be made to react together at elevated temperatures in the presence of mixtures of alumina and chromium oxide to form pyridine.

I have now found that the course of the reaction can be altered, so that different organic bases are formed, by using a finely divided palladium catalyst. The organic bases thus formed appear to correspond to the molecular formula $C_{15}H_{27}N_3$. The product is usually a mixture, the principal components of which are believed to be the various isomeric polycyclic amine products known as tripiperideines and described by Schöpf et al. (Annalen der Chemie 559 (1948), page 1; Chem. Ber. 84, 690–9 (1951)).

Thus according to the present invention we provide a process for the manufacture of organic bases which comprises contacting a mixture of tetrahydrofurfuryl alcohol and ammonia at elevated temperatures with finely divided palladium as catalyst.

The palladium catalyst may be made in conventional manner and is most conveniently used on a support or carrier, for example alumina. The proportion of palladium metal on the carrier need not be very high, and a catalyst containing as little as 0.04% by weight of palladium metal on alumina is very suitable for use in my process.

The proportions of tetrahydrofurfuryl alchohol and ammonia to be used are conveniently within the range of 1 to 10 moles of ammonia for each mole of tetrahydrofurfuryl alcohol. Larger proportions of ammonia may cause inconvenience or expense, through loss or need for recovery, and smaller proportions tend to lower the efficiency of conversion of the tetrahydrofurfuryl alcohol to bases, but such proportions may be used if desired.

I prefer to add hydrogen to the mixture of tetrahydrofurfuryl alcohol and ammonia, as this tends to minimise undesired side-reactions. The proportion of hydrogen is preferably between 1 and 10 moles for each mole of tetrahydrofurfuryl alcohol. Larger proportions may be used if desired, but these tend to introduce problems of condensation and recirculation with the large volumes of gas or vapour then employed. If desired, inert gases, for example nitrogen, may also be added to the mixture.

The reaction temperatures are preferably within the range 200° C. to 500° C. Higher temperatures tend to cause an increase in the loss of material by carbonisation and lower temperatures tend to give a lower conversion efficiency, but may be used if desired.

It is usually most convenient to operate the process by vapourising tetrahydrofurfuryl alcohol at the desired rate, mixing the vapour with the desired proportion of ammonia (and hydrogen, when this also is used), heating the mixture and passing it through a bed of catalyst particles or granules in a reaction vessel which maintained at the requisite reaction temperature, for example by external heating.

The reaction proceeds satisfactorily at substantially atmospheric pressures, but higher or lower pressures may also be used if so desired.

During the process, deposition of carbonaceous decomposition products may take place on the catalyst. In this event, the catalyst can be regenerated in conventional manner, for example by heating in a current of air to burn away the carbonaceous deposit.

The organic bases may be recovered from the vapours emerging from the catalyst by conventional means, for example by condensation, fractional distillation, crystallisation, or combinations of such techniques.

The organic bases produced by my process may be treated to separate individual components thereof or to convert the component bases into other products. Thus in particular when the crude mixed bases are heated at a high (i.e. alkaline) pH, for example by boiling the mixed free bases, iso-tripiperideine (solid, melting point 97–98° C.) can be isolated. This iso-tripiperideine can be converted, by hydrogenation in the presence of platinum oxide in dilute hydrochloric acid, into 2:3′-bipiperidyl and piperidine. Dehydrogenation of the 2:3′-bipiperidyl gives 2:3′-bipyridyl. Other tripiperideines which can be obtained are α-tripiperideine (M.P. 61–62° C.), β-tripiperideine (M.P. 72–74° C.) and aldo-tripiperideine (M.P. 120–121° C.). In general, it is most convenient to isolate iso-tripiperideine and convert this by isomerisation, using known methods, into other tripiperideines, for example into aldo-tripiperideine by heating with ammonium chloride or an aqueous buffer at pH 9.

The organic bases are useful as intermediates in chemical synthesis, and particularly as a conveniently intermediate for the manufacture of 2:3′-bipiperidyl and its derivatives, which were previously relatively inaccessible.

The invention is illustrated but not limited by the following example in which the parts and percentages are by weight.

*Example*

A catalyst containing 0.04% of finely divided palladium metal supported on alpha alumina was formed into pellets ⅛ inch by ⅛ inch (3 mm. by 3 mm. approximately) and having a surface area of approximately 16–20 sq. metres per gram. 148 parts of this catalyst are placed in a reactor tube of 1.2 inches (approximately 3 cm.) internal diameter provided with a central thermocouple pocket and heated in an electrical resistance furnace. The depth of the catalyst bed so formed is 9 inches (approximately 23 cm.).

A mixture of tetrahydrofurfuryl alcohol (506 parts, 5 moles), ammonia (434 parts, 25.5 moles) and hydrogen (51 parts, 25.5 moles) is passed through the reactor during a period of 17 hours while the main body of the catalyst is maintained at 350° C. The vapours emerging from the reactor are then condensed by cooling, to give 602 parts of a crude reaction product which separates on standing into a lower layer of a brown organic oil and an upper layer of a colourless aqueous phase.

Slow distillation of the crude reaction product at atmospheric pressure, without previous separation of the phases, removes water and any small amounts of volatile substances such as pyridine which may be present, and leaves a residual, substantially involatile, oil in an amount equal to half of the original crude reaction product.

This residual oil, by solution in warm acetone (84 parts per 100 parts of oil) and cooling to room temperature yields a crystalline base (35 parts per 100 parts of oil) having a melting point of 97–98° C.

The crude oil prior to crystallisation has the analysis C 72.2%, H 10.9%, N 16.0% (the formula $(C_5H_9N)_n$ requires C 72.3%, H 10.8%, N 16.9%).

The crystallised product of melting point 97–98° C. has (a) the analysis C 72.1%, H 10.6%, N 16.8%, (b) an infra-red spectrum which shows absorption bonds at frequencies characteristic of N—H and C—H bonds but none at frequencies characteristic of double bonds, and (c) a molecular weight of 250 as determined cryoscopically in benzene. These details, together with study of the nuclear magnetic resonance spectrum of the material in carbon tetrachloride solution, identify the product as isotripiperideine.

What I claim is:
1. Process for the manufacture of tripiperideine bases which comprises contacting a mixture of tetrahydrofurfuryl alcohol and ammonia at elevated temperature with finely divided palladium as a catalyst.
2. Process as claimed in claim 1 wherein the palladium is supported on alumina.
3. Process as claimed in claim 2 wherein the proportion of palladium metal on the alumina is at least 0.04% by weight.
4. Process as claimed in claim 1 wherein the proportion of ammonia used is in the range 1 to 10 moles for each mole of tetrahydrofurfuryl alcohol used.
5. Process as claimed in claim 1 wherein the elevated temperature is in the range 200° C. to 500° C.
6. Process as claimed in claim 1 wherein hydrogen is added to the mixture to be contacted with the catalyst.
7. Process as claimed in claim 6 wherein the proportion of hydrogen used is in the range 1 to 10 moles for each mole of tetrahydrofurfuryl alcohol.

References Cited by the Examiner
UNITED STATES PATENTS

| | | | |
|---|---|---|---|
| 2,543,424 | 2/1951 | Spillane et al. | 260—290 |
| 2,963,484 | 12/1960 | Denton | 260—290 |
| 2,972,615 | 2/1961 | Denton | 260—290 |
| 2,972,616 | 2/1961 | Denton | 260—290 |
| 2,979,510 | 2/1961 | Denton | 260—290 |

WALTER A. MODANCE, *Primary Examiner.*

J. M. FORD, *Assistant Examiner.*